US00RE34786E

United States Patent [19]

Slough

[11] E Patent Number: Re. 34,786

[45] Reissued Date of Patent: Nov. 15, 1994

[54] MOLDED PLASTIC STUD BOX SUPPORT AND BOX

[76] Inventor: Donovan L. Slough, 3301 Brunswick Ave. North, Crystal, Minn. 55422

[21] Appl. No.: 680,242

[22] Filed: Apr. 1, 1991

Related U.S. Patent Documents

Reissue of:

[64] Patent No.: 4,903,851
Issued: Feb. 27, 1990
Appl. No.: 215,988
Filed: Jul. 7, 1988

[51] Int. Cl.[5] ..... A47B 96/06

[52] U.S. Cl. ..... 248/205.1; 24/618; 220/3.9; 248/27.1; 248/906; 411/509; 411/544

[58] Field of Search ..... 248/27.1, 345.1, 906, 248/73, 221.4, 682, 205.1; 52/221, 514, 99; 24/662, 681, 618, 627; 411/482, 508, 509, 510, 544, 535, 536; 220/3.4, 3.5, 3.6, 3.3, 3.9

[56] References Cited

U.S. PATENT DOCUMENTS 1,309,586 7/1919 Nelson .
1,453,017 4/1923 Lindelof .
1,856,356 5/1932 Owen .
1,873,509 8/1932 Thomas, Jr. .
2,260,829 10/1941 Carlson .
2,295,333 9/1942 Clark .
2,342,170 2/1944 Tinnerman .
2,442,340 6/1948 Buchanan et al. .
2,473,051 6/1949 Carlson .
2,512,188 6/1950 Wait et al. .
2,531,840 11/1950 Carlson .
2,555,923 6/1951 Elstad .
2,874,603 2/1959 Boettcher .
2,914,601 11/1959 Fuss .
2,933,549 4/1960 Antonucci .
2,962,252 11/1960 Frank .
3,025,338 3/1962 Cook et al. .
3,210,032 10/1965 Van Slyke .
3,688,635 9/1972 Fegen .
3,834,107 9/1974 Standing .
4,057,164 11/1977 Maier .
4,075,809 2/1978 Sirkin .
4,163,817 8/1979 DiCarlantonio et al. .

*Primary Examiner*—J. Franklin Foss
*Attorney, Agent, or Firm*—Haugen & Nikolai

[57] ABSTRACT

A support and stabilizing apparatus for an electrical outlet box, such as a conventional electrical outlet box having a plurality of side walls and a back wall defining a chamber with an open front and having an access bore formed through at least one of the walls, The support and stabilizing apparatus comprises a stud apparatus having a shaft with forward and rearward opposed ends and generally cylindrical forward and rearward abutment plates secured to the shaft in predetermined spaced apart relationship. The rearward plate is disposed at the rearward end of the shaft, and the forward plate is disposed near and spaced inwardly from the forward end of the shaft so as to create a mounting segment between the forward plate and the forward end of the shaft. A flexible retainer is provided for supporting the mounting segment, to grippingly engage that portion of the mounting segment which projects into the outlet box chamber. The rearwardly projecting portion of the support and stabilizing apparatus provides a backup support pad for the electrical outlet box when resting against the inner surface of the wall panel opposite that panel upon which the electrical outlet box is mounted.

6 Claims, 1 Drawing Sheet

MOLDED PLASTIC STUD BOX SUPPORT AND BOX

Matter enclosed in heavy brackets [ ] appears in the original patent but forms no part of this reissue specification; matter printed in italics indicates the additions made by reissue.

BACKGROUND OF THE INVENTION

The present invention relates to support means for electrical outlet boxes, and particularly to means for stabilizing electrical outlet boxes mounted within the space formed by stud walls separating adjacent interior wall panels of a building structure. Typically, commercial office buildings employ a wall system which utilizes sheet metal studs to support spaced apart panels of sheet rock, forming walls which are semipermanent in nature, but capable of rapid alteration in the event of a change in space requirements for the occupant. Such walls are normally employed in modern office buildings in lieu of cement block, wooden stud walls, or the like, because of their ease of assembly, and the manner in which the walls may be erected and finished.

Such wall structures must accomodate the electrical requirements of the occupant. Typically, these walls contain convenience outlets, switching outlets, and the like. Modern office buildings frequently utilize channels in the sub-floor area of each story to accommodate electrical mains, as well as other electrical lines, and when appropriate, the electrical lines are brought up through access bores formed in the floor and enter the space between the panels forming the stud wall. These walls frequently do not posses sufficient rigidity to accommodate the needs of an electrical outlet box, particularly a convenience outlet which may be subject to frequent plug-in and plug-removal operations. The gypsum wallboard, normally termed "sheet rock", is brittle, frangible, and subject to rapid deterioration when exposed to the stress concentrations induced by frequent plug-in and plug-removal activity in connection with an electrical convenience outlet box.

In order to assist in the support and stabilization of electrical outlet boxes when mounted in such semi-permanent stud walls, if is frequently desirable to employ some means for permitting a portion of a load to be applied against the interior surface of the opposite wall panel. Sheet metal brackets have been used from time to time, and while these sheet metal brackets have been found useful, they nevertheless suffer from certain disadvantages and drawbacks.

For example, the sheet metal brackets are secured to the surfaces of the electrical outlet box by ears or the like which grip the walls of the electrical box through the wall thickness thereof. Any of the forces which tend to create the problem requiring the use of such a support bracket also tend to cause the bracket to become dislodged, misaligned, or otherwise achieves an anomalous disposition within the wall so as to render the support bracket substantially useless. Also, the brackets must be supplied in various dimensions to accommodate various stud-wall thicknesses encountered in normal usage.

Prior art examples of mounting electrical outlet boxes between two spaced apart walls include U.S. Pat. No. 2,512,188 (Wait), showing a screw threaded into a coupling member mounted to the outlet box and to a base or foot-piece positionable against a back wall. The screw is turned to alter the distance between the coupling member and foot-piece. Other disclosures of screws utilized as spacers include U.S. Pat. No. 2,555,923 (Elstad), U.S. Pat. No. 2,531,840 (Carlson) and U.S. Pat. No. 2,473,051 (Carlson). While perhaps appropriate in certain applications, the structures do not address the use for a reliable, easily installed support for electrical outlet boxes mounted in walls comprised of spaced apart gypsum board panels.

Therefore, it is a primary object of the present invention to provide an improved support and stabilizing means for an electrical outlet box having means for receipt of the mounting pad against the interior surface of an opposed wall panel in a stud wall structure, and wherein the support and stabilizing means, by simple alteration, may be utilized to accommodate stud walls of conventional and varying thickness dimensions.

Another object of the present invention is to provide an improved support and stabilizing means for an electrical outlet box which is designed to be easily and readily mounted within the outlet box, and furthermore is arranged to be held firmly in place without adversely affecting the quality, application, or safety of the electrical system.

Yet another object of the invention is to provide a stabilizing means for an electrical outlet box mounted in the wall including two upright parallel spaced apart panels, which can be installed rapidly witout any risk of damage to the panels or adjoining structure.

SUMMARY OF THE INVENTION

To achieve these and other objects, there is provided an apparatus for supporting an electrical outlet box in a structural wall including spaced apart first and second wall panels, in particular with a conventional electrical outlet box including a plurality of side walls and a back wall defining a chamber open at the front, and with a flange means aligned with the open front. The outlet box is supported with the flange means against the first panel, and with the back wall parallel to the panels.

The apparatus includes an elongate shaft disposed horizontally, or normal to the back wall and panels. First and second abutment members are formed concentrically on the shaft and spaced apart from one another a first predetermined distance corresponding to the separation between the back wall and second panel when the electrical outlet box is in place. The first abutment member is located at the forward end of the shaft, and the second abutment member is mounted at the rearward end of the shaft. The apparatus further includes a mounting segment disposed forwardly of the first abutment member and coaxial with the shaft. The mounting segment includes two parallel and spaced apart flexible legs extended forwardly of the first abutment member, each converging to a forward tip region, and two flared portions, one flared portion projected rearwardly and transversely outwardly of its associated tip region. Each flared portion includes a rearward shoulder spaced apart from its associated leg. The flared portions together define a forwardly converging cone with a rearward end or shoulder of the cone being defined by the shoulder portions of the flared segments. The apparatus further includes a flexible retaining member with a retaining opening formed through the retaining member. The retaining opening has a diameter larger than the forward end of the cone, and less than the rearward end or shoulder of the cone. The apparatus is mounted to the back wall by inserting the mounting section into the chamber through a bore in the back wall. The retaining member is positioned against the back wall from the inside of the chamber between the back wall and the shoulders. The legs and flared segments of the mounting section are elastic and are deflected radially inward, thus to allow insertion of the shoulder through the retaining opening. Once behind the shoulder, the retaining member is at least slightly elastically bent, and thus urges the cone and shaft forwardly to maintain the first abutment member contiguous with the back wall of the outlet box.

In an alternative form of the invention, the mounting section is cylindrical and has external threads, sized for threaded engagement of the mounting section into the retaining opening. The retaining member is progressively elastically deformed as the mounting section is further threaded into it, thus adjustably increasing the force with which it maintains the first plate member against the back wall.

A further aspect of the invention is a third abutment member or plate member between the first and second plate members, and spaced from the first plate member a second predetermined distance corresponding to the distance between the back wall and a third panel closer to the first panel than the second panel. The shaft is adapted for severence immediately behind the third plate member, thus easily accommodating the narrower spacing between panels.

Preferably, the shaft and abutment members or plates are formed as a unitary member of a flexible material such as nylon or the like.

In accordance with the present invention, the apparatus is easily installed, either by a snap fit of the flexible retaining member over the cone by deflection of the legs and flared wings, or alternatively by threading the shaft upon the retaining member. In either case, the appropriate spacing is predetermined, either by the distance between the first and second plate members, or by the distance between the first and third plate members following severance of the shaft. Both predetermined distances correspond to commonly encountered spacing between upright wall panels in such structural walls. Since the spring is not adjusted by rotating a screw or the like, there is no change of damage to either wall panel through over-turning of a screw. The spacers further can be installed rapidly by skilled and unskilled laborers alike.

IN THE DRAWINGS

For a better understanding of the above and other advantages, references is made to the following detailed description along with the drawings, in which.

Figure 4:
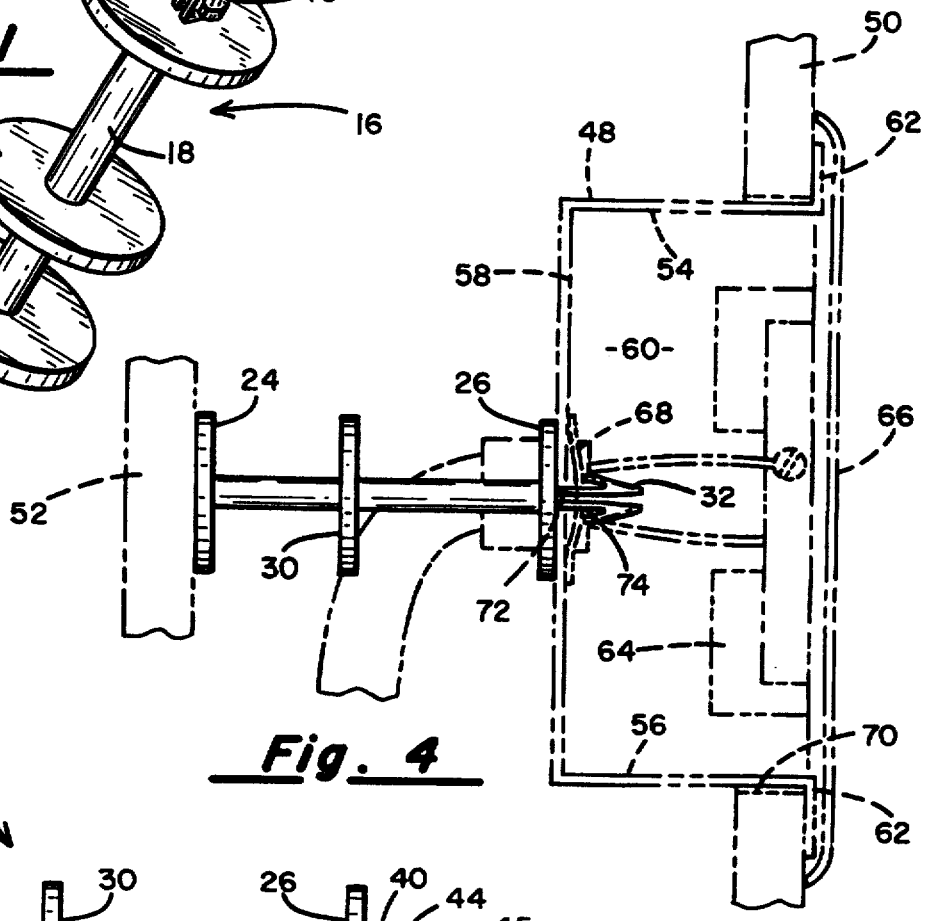
Figure 5:
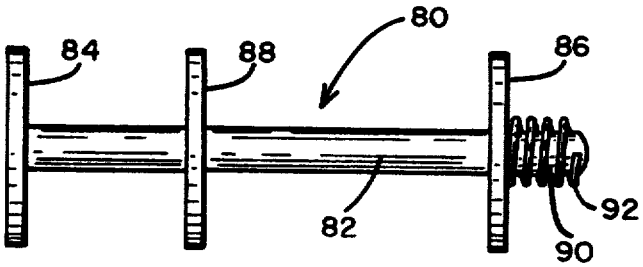

FIG. 4 is a side elevational view, partly in section, illustrating the support and stabilizing means in combination with a conventional electrical outlet box with a duplex outlet being shown in phantom as conventionally retained between upright, spaced apart wall panels; and FIG. 5 is a side elevation similar to FIG. 4, showing an alternative support stud constructed in accordance with the present invention.

DESCRIPTION OF THE PREFERRED EMBODIMENTS

Figure 1:
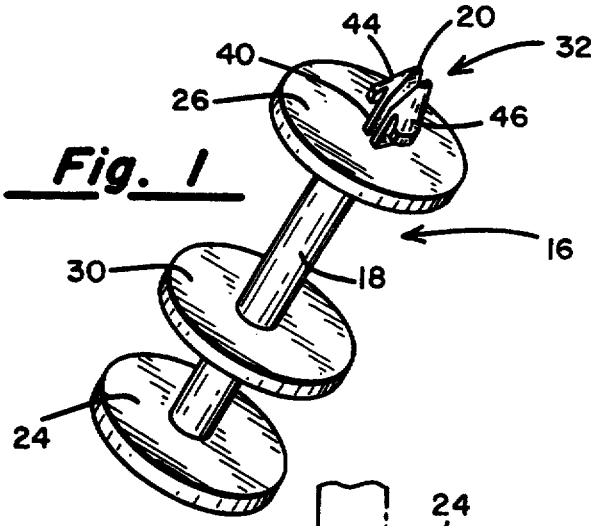
FIG. 1 is a perspective view of an electrical outlet box support and stabilizing means constructed in accordance with the present invention.

Turning now to the drawings, there is shown in FIG. 1 a support and stabilizing means or support stud 16 having an elongated shaft 18 with opposed forward and rearward ends 20 and 22. A first generally cylindrical plate or abutment member 24 is secured to the shaft 18 adjacent rearward end 22. A second (forward) generally cylindrical plate or abutment member is shown at 26, with the first and second plates being spaced apart along the length of shaft 18. The second plate 26 is disposed rearwardly form and in spaced relationship to forward end or tip 20 of the shaft, and defines a relatively short mounting segment 28 coaxial with shaft 18. Mounting segment 28 extends, as is apparent, between second plate 26 and the end 20 of shaft 18. A third cylindrical plate or abutment member is illustrated at 30, and its purpose and use is described hereinafter.

Each of the plates 24, 26 and 30 has a disk configuration. It will be appreciated, of course, that the term "cylindrical" is used in a comprehensive sense, and configurations departing from circular may be employed advantageously, such as, for example, cylindrical head portions having square faces.

Figure 2:
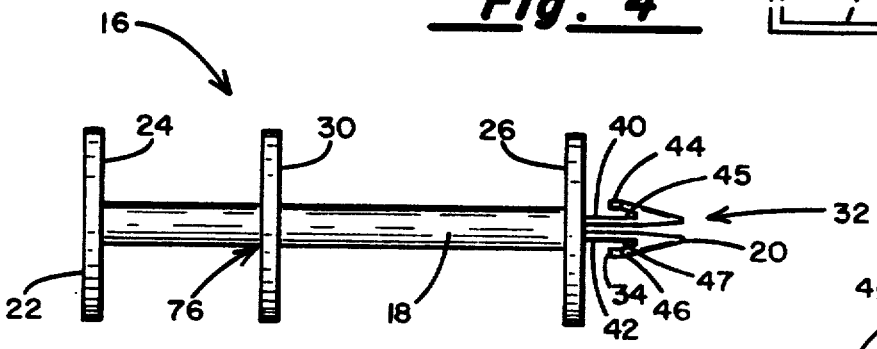
FIG. 2 is a side elevational view of the support and stabilizing means as illustrated in FIG. 1.

As is apparent from FIG. 1 and 2, mounting segment 28 of shaft 18 includes a forward portion 32 shaped as a forwardly converging truncated cone. From forward end 20 which has a diameter substantially less than the nominal diameter of shaft 18, cone 32 diverges to a rear wall or shoulder 34 having a diameter larger than the shaft diameter.

Figure 3:
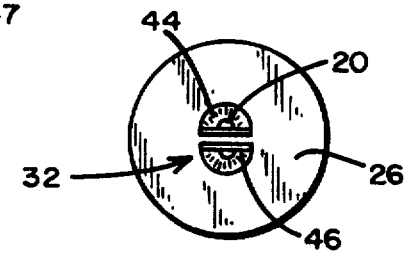
FIG. 3 is a front end view of the support and stabilizing means of FIG. 1.

As perhaps best seen from FIGS. 1 and 3, a groove 36 runs the length of mounting section 28 from plate 26 to forward end 20. Groove 36 thus divides the mounting segment into two substantially identical and opposed legs 40 and 42. Flared extensions 44 and 46 are formed as parts of legs 40 and 42, respectively. In particular, each extension diverges rearwardly from tip 20 to a rearward wall, with the two rearward walls together forming shoulder 34. A gap is formed between each of the extensions and its associated leg, a indicated at 45 and 47, respectively, to permit a flexing of each flared extension transversely inwardly toward its associated leg. Flared extensions 44 and 46 have rounded and forwardly converging outer surfaces, whereby together these extensions define cone 32.

FIG. 4 illustrates the use of support stud 16 to stabilize an electrical outlet box 48 mounted in s structural wall including parallel, spaced apart and upright front and rear wall panels 50 and 52. Outlet box 48 includes a plurality of side walls, two of which are shown at 54 and 56, and a back wall 58 parallel to panels 50 and 52. The side and backwalls define chamber 60 open to the front of the outlet box. Aligned with the open front of the outlet box are ears or flanges 62.

A duplex outlet 64 is mounted in chamber 60, and a cover plate 66 is secured to the duplex outlet receptacle in a known manner.

Support stud 16 is disposed horizontally, or normal to the back wall and panels. A planar and transverse abutment surface of first abutment member 24 is continuous with panel 52, and a planar and transverse abutment surface of forward abutment member 26 is contiguous with back wall 58. The forward plate is maintained against the back wall by a flexible retainer 68, e.g. a Tinnerman nut. Retainer 68 is normally curved, and as illustrated in the figure is slightly elastically deformed to a configuration somewhat flatter than its normal, unstressed configuration. Accordingly, retainer 68 stores residual stresses and thus pushes against back wall 58 and shoulder 34 to urge cone 32 forwardly or to the right as viewed in the figure, which serves to retain forward plate 26 firmly against the back wall of the electrical outlet box.

To install electrical outlet box 48, an electrician initially cuts an opening 70 through wall panel 50, conforming to the shape of the outlet box. Then, mounting segment 28 is inserted into chamber 60 through an access bore 72 formed through back wall 58. Access bore 72 is conventional and typically of a standard size. Preferably shaft 18 has a diameter nearly equal to but slightly less than the diameter of a bore 72, such that some elastic bending in legs and flared extensions 40–46 is necessary to reduce the effective diameter of shoulder 34 sufficiently for its passage through the bore.

With mounting segment 28 fully inserted, retainer 68 with its concave surface facing rearwardly is inserted upon the mounting segment, with forward portion 32 passing through a circular retainer opening 74 formed through the retainer. Opening 74 has a diameter greater than that of forward end 20, but, less than that of shoulder 34, causing the radially inward benign of legs 40 and 42 and extensions 44 and 46 as discussed above, along with elastic bending or flattening of the retainer, until retainer 68 is rearwardly of shoulder 34, whereupon the legs and extensions return to their unstressed configuration to maintain retainer 68 between shoulder 34 and back wall 58. This dual flexure of cone 32, involving both the legs and the flared extensions, increases the utility of stud 16 in its ability to accommodate differently sized access bores and retainer openings, and further reduces the cost of manufacturing the stud by allowing less severe tolerances in forming the cone.

Given the predetermined spacing between abutment members 24 and 26, abutment [members] *member* 24 engages wall panel 52 just as flanges 62 engage wall panel 50. The spacing between plates is predetermined in accordance with the standard space between the panels, and not subject to operator adjustment. This not only facilitates installation, but ensures against damage to the wall, particularly panel 52, through improper adjustment of stud 16 with respect to back wall 58. Plate member 24, given its relatively large surface area contiguous with panel 52, distributes the force from the shaft upon the panel over a sufficiently wide area to substantially eliminate any possible damage to the panel.

In these instances when the need is indicated, and as is conventional in commercial remodeling operations, the wall thickness of the stud wall into which the electrical outlet box is being mounted may vary from one thickness to another. This dimension, when of the lesser of the two standard thicknesses, will be designed to accommodate a support and stabilizing means of the type shown herein and with a total shaft length extending only to third plate 30. In those instances, the electrician merely severs the shaft behind plate 30 as at 76, discarding the removed portion, and permitting plate 30 to surface engage the interior of the adjacent wall panel, such as the surface of a wall panel spaced nearer to wall panel 50 in an alternative narrower structural wall construction.

It will be appreciated that plate 30 is disposed generally midway along shaft 18, and is provided in order to accommodate usage of a single standard molded device for a variety of ultimate applications. The shaft is severable, since the device preferably is fabricated from molded polystyrene, molded nylon, or the like. It is desirable to employ an electrically non-conductive material, although such material is not absolutely required.

FIG. 5 illustrates a second embodiment stud 80 with an elongate shaft 82, and rearward, forward and intermediate abutment plates 84, 86 and 88 all concentric on shaft 82. A mounting sector 90 of shaft 82 is provided with external threads 92, sized for a threaded engagement with retainer opening 74 as mounting section 90 is mounted to the electrical outlet box as previously described in connection with support stud 16. Support stud 80 is installed in the position illustrated in FIG. 4 by inserting it through a bore 72 and retainer opening 74. Since mounting segment 90 is sized for threaded engagement with the retainer opening, inserting therethrough is achieved by rotation of shaft 82, first to bring retainer 68 against back wall 58, and then to progressively, elastically flatten or deform the retainer. Threaded support stud 80 thus takes slightly longer to install than support stud 16, but affords the advantage of adjusting the amount of elastic deformation, and therefore the residual force in retainer 68.

What is claimed is:

1. An electrical outlet box and an apparatus for supporting said electrical outlet box with respect to parallel and spaced apart first and second structural wall panels, said apparatus comprising: an outlet box having a plurality of side walls and a back wall defining a chamber with an open front, a flange means aligned with said open front and parallel with said back wall, and an access bore formed through said back wall, a unitary support member including an elongate shaft, a first abutment member formed at a rearward end of said shaft, disposed transversely of the shaft and having a substantially planar and transverse first abutment surface, and a second abutment member formed proximate a forward end of the shaft, said second abutment member having a substantially planar and transverse second abutment surface;

mounting segment disposed forwardly of said second abutment member and substantially coaxially with said shaft, said mounting segment including two parallel and spaced apart flexible legs extending forwardly of the second abutment member, each leg converging to a tip region, and two flared extensions, one flared extension projected rearwardly and transversely outwardly of the tip region of each of said legs, each flared extension including a rearward end portion spaced apart from its associated leg, said flared extensions together defining a forwardly converging cone having a forward tip and said rearward portions together defining a shoulder of the cone; and a flexible retaining member and means forming a retainer opening through the retaining member larger in diameter than said forward tip and smaller in diameter than said shoulder, said legs being flexible to permit their transversely inward displacement a sufficient amount to permit passage of said cone through said access bore of said outlet box and said retainer opening; whereby said retaining member is positionable about said shaft between said shoulder and said back wall of said outlet box, with said mounting portion extended through said access bore of sad outlet box and into the chamber of said outlet box, with said flexible retaining member being elastically compressed to urge said shaft forward and thereby retain said second abutment member against said back wall of said outlet box with said second abutment surface contiguous with said back wall of said outlet box; and wherein a first distance between said first and second abutment surfaces is predetermined in accordance with the separation between said first and second structural wall panels, whereby said first abutment surface of said first abutment member is contiguous with one of said panels, and said flange means of said outlet box is contiguous with the other of said wall panels, with said shaft normal to said panels.

2. The apparatus of claim 1 further including:

a third abutment member disposed between said first and second abutment members and spaced apart from said second abutment member a predetermined second distance, said shaft being adapted for [serving] *severing* along a rearward transverse surface of said third abutment member.

*3. An electrical box and an apparatus for supporting the electrical box with respect to parallel and spaced apart first and second structural wall panels, said apparatus comprising:*

*an electrical box having a plurality of side walls and a back wall defining a chamber with an open front, a forward edge means aligned with said open front and parallel with said back wall, and an access bore formed through said back wall;*

*a unitary support member including an elongate shaft, a first abutment member formed at a rearward end of said shaft, disposed transversely of the shaft and having a substantially planar and transverse first abutment surface, and a second abutment member formed proximate a forward end of the shaft, said second abutment member having a substantially planar and transverse second abutment surface; and*

*a mounting segment disposed forwardly of said second abutment member and substantially coaxially with said shaft, said mounting segment including two parallel and spaced apart flexible legs extending forwardly of the second abutment member, each leg converging to a tip region, and two flared extensions, one flared extension projected rearwardly and transversely outwardly of the top region of each of said legs, each flared extension including a rearward end portion spaced apart from its associated leg, said flared extensions together defining forwardly converging cone having a forward tip and said rearward portions together defining a shoulder of said cone;*

*said access bore being smaller in diameter than said shoulder, said legs being flexible to permit their transversely inward displacement a sufficient amount to permit passage of said cone through said access bore of said electrical box, with said mounting portion extended through said access bore of said electrical box, into the chamber of said electrical box, and with said second abutment surface contiguous with said back wall of said electrical box; and*

*wherein a first distance between said first and second abutment surfaces is predetermined in accordance with the separation between said first and second structural wall panels, whereby said first abutment surface of said first abutment member is contiguous with one of said panels, said second abutment surface is contiguous with said back wall of said electrical box, and said forward edge means of said electrical box is contiguous with the other of said wall panels, with said shaft normal to said panels.*

*4. The apparatus of claim 3 further including:*

*a third abutment member disposed between said first and second abutment members and spaced apart form said second abutment member a predetermined second distance, said shaft being adapted for severing along a rearward transverse surface of said third abutment member.*

*5. The apparatus of claim 3 further including:*

*a flexible retaining member and means forming a retainer opening through the retaining member larger in diameter than said forward tip and smaller in diameter than said shoulder, said retaining member being positionable about said shaft between said shoulder and said back wall of said electrical box, with said mounting portion so extended through said access bore and into the chamber of said electrical box, and with said flexible retaining member being elastically compressed to urge said shaft forward and thereby retain said second abutment member against said back wall of said electrical box with said second abutment surface contiguous with said back wall of said electrical box.*

*6. The apparatus of claim 3 wherein:*

*said forward edge means includes a flange.*

* * * * *

UNITED STATES PATENT AND TRADEMARK OFFICE

CERTIFICATE OF CORRECTION

PATENT NO. : RE34,786

DATED : November 15, 1994

INVENTOR(S) : Donovan L. Slough

It is certified that error appears in the above-indentified patent and that said Letters Patent is hereby corrected as shown below:

Column 7, claim 3, line 48 please delete "top" and insert -- tip --.

Column 8, claim 4, line 27 please delete "form" and insert -- from --.

Signed and Sealed this

Eighteenth Day of April, 1995

Bruce Lehman

*Attest:*

BRUCE LEHMAN

*Commissioner of Patents and Trademarks*

*Attesting Officer*

UNITED STATES PATENT AND TRADEMARK OFFICE

CERTIFICATE OF CORRECTION

PATENT NO. : RE34,786

DATED : November 15, 1984

INVENTOR(S) : Donovan L. Slough

It is certified that error appears in the above-indentified patent and that said Letters Patent is hereby corrected as shown below:

On title page, item [54] and col. 1, lines 2-3, should read as follows:

In the title, the words "And Box" should be bracketed.

Signed and Sealed this

Twenty-seventh Day of June, 1995

*Attest:*

Bruce Lehman

BRUCE LEHMAN

*Attesting Officer*

*Commissioner of Patents and Trademarks*